US010209388B2

(12) United States Patent
Wilt et al.

(10) Patent No.: US 10,209,388 B2
(45) Date of Patent: Feb. 19, 2019

(54) METHOD AND APPARATUS TO GENERATE A CROSSWELL DATA SET

(71) Applicant: Schlumberger Technology Corporation, Sugar Land, TX (US)

(72) Inventors: Michael Wilt, Walnut Creek, CA (US); Ping Zhang, Albany, CA (US); Nestor Cuevas, Milan (IT); Jiuping Chen, San Pablo, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 189 days.

(21) Appl. No.: 14/223,927

(22) Filed: Mar. 24, 2014

(65) Prior Publication Data

US 2015/0177413 A1 Jun. 25, 2015

Related U.S. Application Data

(60) Provisional application No. 61/918,737, filed on Dec. 20, 2013.

(51) Int. Cl.
*G01V 3/30* (2006.01)

(52) U.S. Cl.
CPC ..................... *G01V 3/30* (2013.01)

(58) Field of Classification Search
CPC ............. G01V 99/00; G01V 3/08; G01V 3/12
See application file for complete search history.

(56) References Cited

U.S. PATENT DOCUMENTS

| | | | | |
|---|---|---|---|---|
| 5,652,519 A * | 7/1997 | Warren | ..................... | G01V 3/06 324/339 |
| 5,886,255 A * | 3/1999 | Aronstam | ............... | E21B 47/00 166/254.1 |
| 6,308,787 B1 * | 10/2001 | Alft | .......................... | E21B 7/06 175/48 |
| 6,388,947 B1 * | 5/2002 | Washbourne | ............ | G01V 1/42 367/38 |
| 6,393,363 B1 * | 5/2002 | Wilt | ......................... | G01V 3/30 324/323 |
| 7,030,617 B2 * | 4/2006 | Conti | ....................... | G01V 3/28 324/339 |
| 8,800,684 B2 * | 8/2014 | Krueger | ................ | E21B 43/305 166/255.2 |

(Continued)

OTHER PUBLICATIONS

Abubakar, et al. 2.5D forward and inverse modeling for the interpretation of low-frequency electromagnetic measurements, 2008, Geophysics, vol. 73, No. 4, Jul.-Aug. 2008, pp. F164-F177.

(Continued)

*Primary Examiner* — Giovanni Astacio-Oquendo
*Assistant Examiner* — Alvaro Fortich
(74) *Attorney, Agent, or Firm* — Michael Dae

(57) ABSTRACT

Systems, methods, and apparatuses to generate a crosswell data set are described. In certain aspects, a method includes producing a first electromagnetic field at the earth's surface with a transmitter at a first location, detecting in a first borehole a first field signal induced by the first electromagnetic field, detecting in a second borehole a second field signal induced by the first electromagnetic field, and generating a crosswell data set from the first field signal and the second field signal. A formation model may be created from the crosswell data set.

22 Claims, 11 Drawing Sheets

(56) References Cited

U.S. PATENT DOCUMENTS

| | | | | |
|---|---|---|---|---|
| 2003/0163258 A1* | 8/2003 | Haugland | G01V 3/28 | 702/6 |
| 2004/0068376 A1* | 4/2004 | Aronstam | G01V 1/42 | 702/14 |
| 2005/0279532 A1* | 12/2005 | Ballantyne | E21B 47/12 | 175/40 |
| 2006/0018833 A1* | 1/2006 | Murphy | A61K 49/0008 | 424/9.2 |
| 2006/0023567 A1* | 2/2006 | Uhl | G01V 1/40 | 367/13 |
| 2006/0139646 A1* | 6/2006 | DiFoggio | E21B 49/10 | 356/436 |
| 2009/0005992 A1* | 1/2009 | Alumbaugh | G01V 3/30 | 702/7 |
| 2009/0039889 A1* | 2/2009 | Wilt | G01V 3/30 | 324/338 |
| 2009/0150124 A1* | 6/2009 | Wilt | G01V 3/38 | 703/1 |
| 2009/0157316 A1* | 6/2009 | Alumbaugh | G01V 3/30 | 702/7 |
| 2009/0237084 A1* | 9/2009 | Itskovich | G01V 3/28 | 324/339 |
| 2009/0281731 A1* | 11/2009 | Morrison | G01V 3/28 | 702/7 |
| 2009/0302852 A1* | 12/2009 | Levesque | G01V 3/30 | 324/338 |
| 2010/0044108 A1* | 2/2010 | Bespalov | E21B 47/0905 | 175/24 |
| 2010/0250141 A1* | 9/2010 | Tompkins | G01V 3/30 | 702/7 |
| 2011/0139507 A1* | 6/2011 | Krueger | E21B 43/305 | 175/45 |
| 2012/0051189 A1* | 3/2012 | Signorelli | G01V 3/12 | 367/177 |
| 2012/0188125 A1* | 7/2012 | Pomietlasz | G01S 13/87 | 342/357.68 |
| 2012/0230151 A1* | 9/2012 | Almaguer | E21B 7/061 | 367/86 |
| 2012/0283952 A1* | 11/2012 | Tang | E21B 47/02216 | 702/7 |
| 2012/0293179 A1* | 11/2012 | Colombo | G01V 3/26 | 324/339 |
| 2012/0294318 A1* | 11/2012 | Fang | G04R 20/06 | 370/503 |
| 2013/0154877 A1* | 6/2013 | Hwang | H04W 56/0025 | 342/357.22 |
| 2013/0169278 A1* | 7/2013 | Bittar | G01V 3/30 | 324/338 |
| 2013/0341092 A1* | 12/2013 | Hay | E21B 7/04 | 175/24 |
| 2015/0233234 A1* | 8/2015 | Jannin | E21B 47/102 | 324/355 |
| 2015/0301218 A1* | 10/2015 | Donderici | G01V 3/18 | 324/339 |

OTHER PUBLICATIONS

Alumbaugh, et al. "Monitoring subsurface changes over time with crosswell electromagnetic tomography: Geophysical Prospecting," 1995, 43, pp. 873-902.

DePavia, et al. "Next generation crosswell EM imaging tool," SPE 116344, Presented at the 2008 SPE Annual Technical Conference and Exhibition, Denver Colorado, Sep. 21-24, 2008, pp. 1-11.

Wilt, et al. "Crosswell electromagnetic tomography: System design considerations and field results," 1995, Geophysics, vol. 60, No. 3, May-Jun. 1995, pp. 871-885.

* cited by examiner

METHOD AND APPARATUS TO GENERATE A CROSSWELL DATA SET

CROSS-REFERENCE TO RELATED APPLICATION

This application is a non-provisional application claiming priority to and the benefit of U.S. Provisional Patent Application No. 61/918,737 filed on Dec. 20, 2013, which is hereby incorporated by reference in its entirety.

FIELD OF INVENTION

The field of invention relates generally to well logging, and, more specifically, to generating a crosswell data set.

BACKGROUND

Electromagnetic fields (e.g., combinations of an electric field and a magnetic field) can be used to determine certain properties of a substance. Oil and gas field logging tools may utilize electromagnetic fields to investigate the properties of earth formations, such as the porosity of formations or the composition and/or presence of fluids within the formations. For example, an electromagnetic field may interact with the formation and those interactions may be detected and analyzed in order to determine information about the formation.

SUMMARY

This summary is provided to introduce a selection of concepts that are further described below in the detailed description. This summary is not intended to identify all features of the claimed subject matter, nor is it intended to be used as an aid in limiting the scope of the claimed subject matter.

In one aspect, a crosswell logging system includes a transmitter at the earth's surface producing an electromagnetic field, a first receiver in a first borehole detecting a first field signal induced by the electromagnetic field, a second receiver in a second borehole detecting a second field signal induced by the electromagnetic field, and a processing unit generating a crosswell data set from the first field signal and the second field signal. The transmitter may be entirely above the earth's surface. The first receiver, the second receiver, or both, may be a multiple axis sensor. A multiple axis sensor may be a three axis sensor. A receiver may include a magnetometer. A formation model may be created from the crosswell data set.

In another aspect, a method includes producing a first electromagnetic field at the earth's surface with a transmitter at a first location, detecting in a first borehole a first field signal induced by the first electromagnetic field, detecting in a second borehole a second field signal induced by the first electromagnetic field, and generating a crosswell data set from the first field signal and the second field signal. Generating the crosswell data set may include determining a difference between the first field signal and the second field signal. Determining a difference between the first field signal and the second field signal may include determining an amplitude difference between the first field signal and the second field signal. Additionally or instead, determining a difference between the first field signal and the second field signal may include determining a phase angle difference between the first field signal and the second field signal. A method of generating a crosswell data set may include producing the first electromagnetic field by the transmitter entirely above the earth's surface.

A method of generating a crosswell data set may include producing a second electromagnetic field at the earth's surface with the transmitter at a second location, detecting in the first borehole a third field signal induced by the second electromagnetic field, detecting in the second borehole a fourth field signal induced by the second electromagnetic field, and generating the crosswell data set from the third field signal and the fourth field signal. The first electromagnetic field and the second electromagnetic field may be produced at discrete times or concurrently. A formation model may be created from the crosswell data set. Creating the formation model may include fitting a numerical model (e.g., fitting an adjustable set of parameters thereof) to the crosswell data set within a (e.g., specified) tolerance. A method of generating a crosswell data set may include detecting in a third borehole a third field signal induced by the first electromagnetic field, and generating the crosswell data set from the first field signal, the second field signal, and the third field signal.

In yet another aspect, a processing unit may include a processor and a data storage device that stores instructions, that when executed by the processor, causes the processor to produce a first electromagnetic field at the earth's surface with a transmitter at a first location, detect in a first borehole a first field signal induced by the first electromagnetic field, detect in a second borehole a second field signal induced by the first electromagnetic field, and generate a crosswell data set from the first field signal and the second field signal. The data storage device may further store instructions, that when executed by the processor, causes the processor to determine a difference between the first field signal and the second field signal to generate the crosswell data set. The data storage device may further store instructions, that when executed by the processor, causes the processor to determine an amplitude difference between the first field signal and the second field signal. Additionally or instead, the data storage device may further store instructions, that when executed by the processor, causes the processor to determine a phase angle difference between the first field signal and the second field signal. The data storage device may further store instructions, that when executed by the processor, causes the processor to produce a second electromagnetic field at the earth's surface with the transmitter at a second location, detect in the first borehole a third field signal induced by the second electromagnetic field, detect in the second borehole a fourth field signal induced by the second electromagnetic field, and generate the crosswell data set from the third field signal and the fourth field signal. The data storage device may further store instructions, that when executed by the processor, causes the processor to produce the first electromagnetic field and the second electromagnetic field at discrete times or concurrently. The data storage device may further store instructions, that when executed by the processor, causes the processor to create a formation model from the crosswell data set. The data storage device may further store instructions, that when executed by the processor, causes the processor to create the formation model by fitting a numerical model to the crosswell data set within a tolerance. The data storage device may further store instructions, that when executed by the processor, causes the processor to detect in a third borehole a third field signal induced by the first electromagnetic field, and generate the crosswell data set from the first field signal, the second field signal, and the third field signal. The data storage device may further stores instructions, that when executed by the processor, causes the processor to produce the first electromagnetic field at the earth's surface with the transmitter entirely above the earth's surface.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details are set forth. However, it is understood that aspects of the disclosure may be practiced without these specific details. In other instances, well-known circuits, structures, and techniques have not been shown in detail in order not to obscure the understanding of this description.

References in the specification to "one aspect," "an aspect," "an example aspect," etc., indicate that the aspect described may include a particular feature, structure, or characteristic, but all aspects may not necessarily include the particular feature, structure, or characteristic. Such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Figure 1:
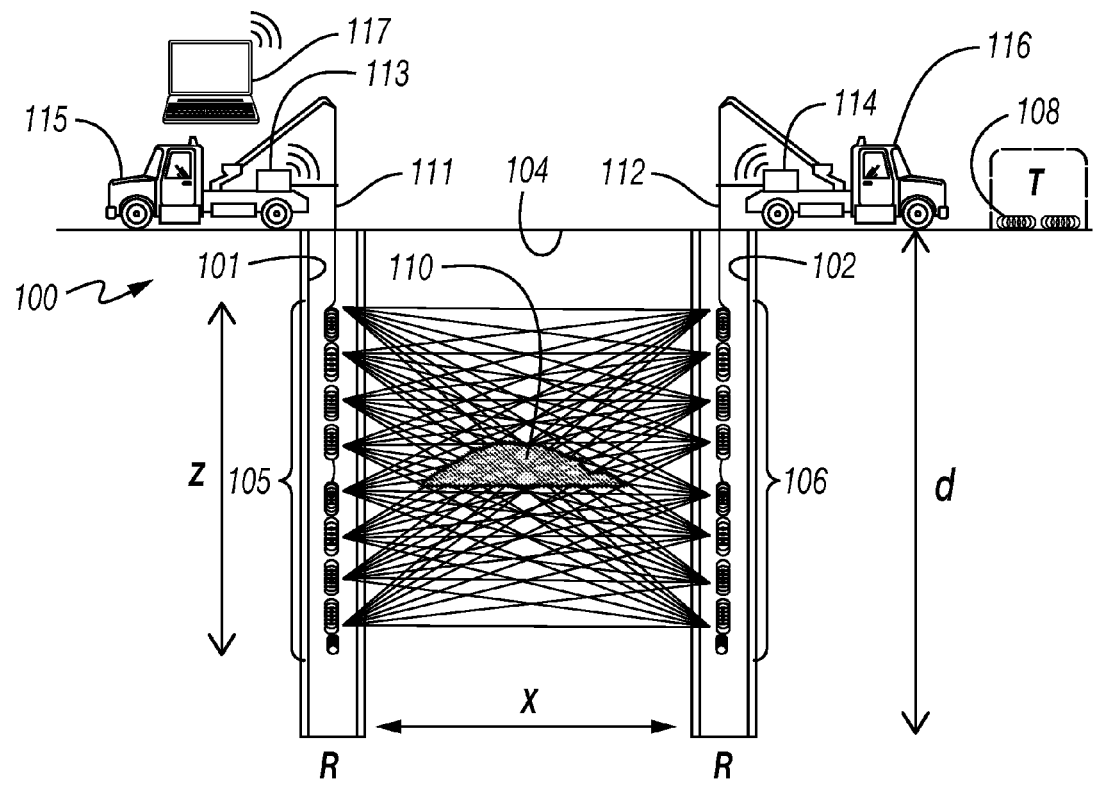
FIG. 1 illustrates a schematic of a crosswell logging system.

FIG. 1 illustrates a schematic of a crosswell logging system 100. The term crosswell, as used herein, generally refers to the properties existing between two or more boreholes, e.g., holes drilled into the earth. Depicted crosswell logging system 100 includes a first borehole 101 (shown optionally as being a cased borehole) and a second borehole 102 (shown optionally as being a cased borehole) extending into the earth through the earth's surface 104.

A borehole (e.g., wellbore) may be formed as known to one of ordinary skill in the art. Boreholes (101, 102) are illustrated as straight boreholes, although they may be curved or otherwise shaped. Borehole may be cased (e.g., lined with a tubular such as metal pipe) or uncased (e.g., having an earthen interior wall). A zone of interest 110 (e.g., oil and/or gas) may exist between boreholes (101, 102). Boreholes may be spaced at a (e.g., smallest or largest) interwell distance (e.g., horizontal spacing) denoted as "x". In one aspect, the interwell distance between (e.g., each of or a pair of) boreholes may be greater than about 500, 1000, 2000, 3000, 4000, 5000, 7500, 10000, 100000, etc., meters. Depicted boreholes extend at a true vertical depth denoted as "d". In one aspect, for each or either borehole, true vertical depth may be greater than 5000, 6000, 7000, 8000, 9000, 10000, 11000, 12000, etc., meters.

Depicted crosswell logging system 100 includes a first receiver 105 disposed in the first borehole 101 and a second receiver 106 disposed in the second borehole 102. Although numerical terms, such as first, second, third, etc., are used in this disclosure, this is for the convenience of reference and should not imply the presence of the other (e.g., lower) numbered components. For example, referring to a component (e.g., receiver or borehole) as a "second" component does not mean the presence of the "first" component.

A receiver may be disposed (e.g., suspended) in a borehole in any manner, for example, via a wireline (111, 112) as depicted or a drillstring (not shown). Wireline may be suspended from a truck (115, 116), although any other support apparatus (e.g., crane, drilling rig, etc.) may be utilized. Wireline (e.g., armored multiconductor cable) may include a communication line, e.g., electrical conductor or an optical fiber. Receiver may communicate through a communication line and/or wirelessly, e.g., via radio waves. Receiver may include a communications unit (113, 114) that collects the data (e.g., signals) from a sensor of the receiver (105, 106) and transmits it. For example, the data may be transmitted to a processing unit 117, depicted herein as a laptop computer (although this disclosure is not so limited). The word "signal" generally refers to any information that may be transmitted and/or received.

Depicted crosswell logging system 100 includes a transmitter 108 disposed on (i.e., entirely above) the earth's surface 104. Transmitter 108 may produce a signal, such as an electromagnetic field. Particularly, a transmitter may produce an electromagnetic field from an induction coil. An electromagnetic field produced may interact with the earth (e.g., different layers of a formation and/or hydrocarbon bearing zone of interest) to induce a different electromagnetic field. The induced electromagnetic field(s) may vary (e.g., with depth and/or lateral spacing) from the transmitted electromagnetic field and signals from the induced electromagnetic field(s) may be detected (e.g., using a sensor). A data set of these field signals may be utilized to determine information about the section of earth (e.g., a formation) where the electromagnetic field was induced. Electromagnetic tomography may be utilized (e.g., based on induction physics and tomographic principles) to create a model (e.g., a 2-dimensional or 3-dimensional map type of model) of the electrical conductivity distribution between two or more boreholes having receivers therein. Electromagnetic tomography may be used for oil and gas reservoir characterization and/or to map water and steam saturation between boreholes (e.g., to determine the resistivity, permeability or permittivity of the zone of interest between the boreholes).

Depicted receivers (105, 106) are illustrated as having the same length, although they may be of differing lengths. In one aspect, receivers each extend at least a desired length (e.g., the length denoted as "z"). Length of receivers (e.g., "z"), for example, the length of each receiver used (e.g., where the field signals are received) when generating a data set, may be selected so as to be greater than or equal to the interwell distance (e.g., "x"). For example, in one aspect, the receiver length (e.g., "z") is selected to be greater than or equal to the largest interwell distance in a group of boreholes used to create a data set. That is, (z/x) is equal to or greater than unity. In one aspect, the boreholes are disposed such that the zone of interest is in the center of the zone defined by the boreholes. In one aspect, a data set includes thousands of measurements of field signals. A receiver element (e.g., discrete section of an induction coil or other sensor) may be spaced at about 2% to 5% of the interwell distance (shown in FIG. 1 as "x") to form a receiver (105, 106). A receiver element may be spaced at generally uniform intervals below, within, and/or above the depth range of the zone of interest, e.g., such that collected field signals may be used to image the interwell space.

Receiver may include a sensor of any type, for example, a sensor that detects an electrical field and/or a magnetic field induced in the earth, e.g., induced by a transmitted electromagnetic field. In one aspect, a sensor is a magnetometer. In one aspect, a sensor is an antenna, e.g., a coil of wire having "n" turns. Receiver may be an induction coil wrapped around a metal (e.g., steel) core. Receiver may be an induction coil not wrapped around a core (e.g., an air core). A sensor may output a signal corresponding to a measured strength (e.g., an amplitude) and/or direction (e.g., phase angle) of a field. A sensor may be a fluxgate magnetometer. In one aspect, a multiple axis sensor may be used, e.g., as noted below in reference to FIG. 3. A multiple axis sensor may include three orthogonal magnetometers (e.g., arranged to provide three [discrete] outputs, each corresponding to the x, y, or z component of the xyz Cartesian coordinate system). In one aspect, a crosswell logging system includes three orthogonal transmitters and each borehole contains at least one set of three orthogonal receivers that are similarly aligned with a respective transmitter. For example, in such an aspect, data corresponding to a field produced in a direction (e.g., in the x, y, or z direction of the xyz Cartesian coordinate system) from a transmitter and an induced field signal received in the same direction (e.g., in the x, y, or z direction of the xyz Cartesian coordinate system) with a receiver in each of a plurality of wells is generated (and optionally recorded).

Figure 14:
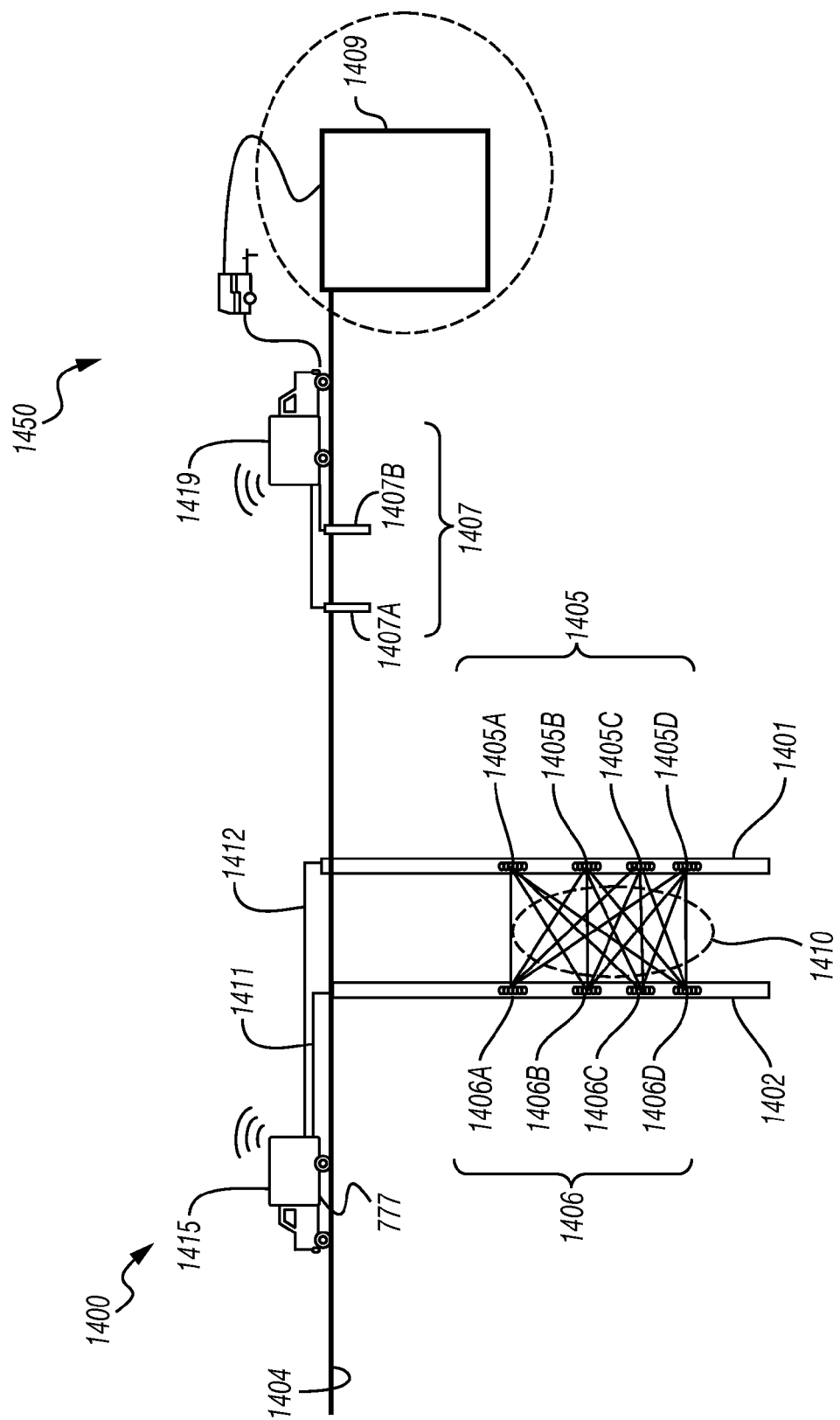
FIG. 14 illustrates a schematic of a crosswell logging system.

Transmitter 108 may be any transmitter that produces a desired output, e.g., an electromagnetic field. Transmitter is depicted as being a set of induction coils, e.g., powered by a power source (not shown). Transmitter (e.g., a power source thereof) may generate an electromagnetic field by any method, including, but not limited to, direct current (e.g., electrical or resistivity) methods, induced polarization methods, microwave frequency (ground-penetrating radar) methods, and natural electromagnetic fields (e.g., magnetotelluric) methods. Transmitter may generate an electromagnetic field at about 10 to 1000 hertz. Transmitter (e.g., an antenna thereof) may be sized to be larger than an entrance to any borehole containing a receiver. Transmitter may produce a magnetic moment greater than one thousand, one million, two millions, five million, ten million, twenty million, fifty million, etc., ampere-square meters (i.e., $A*m^2$). In one aspect, a transmitter is an induction coil having multiple turns ("n") to provide a desired magnetic moment. Transmitter may be an induction coil wrapped around a metal (e.g., steel) core. Transmitter may be an induction coil not wrapped around a core (e.g., an air core). In one aspect, a surface transmitter produces a stronger electromagnetic field (e.g., based on a measurement of the moments) than a transmitter disposed in a borehole (e.g., owing to the space limitations of a borehole). A borehole transmitter (e.g., an antenna thereof to be disposed in a borehole) may have an (e.g., largest) outer diameter less than about 8 centimeters. In one aspect, a surface transmitter (e.g., an antenna) has "n" turns that cumulatively form a square profile, e.g., as schematically shown as reference character 1409 in FIG. 14. A transmitter (e.g., a surface transmitter) may be a (e.g., electric and/or magnetic) bipole (e.g., a grounded wire, for example, as shown in FIG. 14 as reference character 1407). A transmitter may be a (e.g., electric and/or magnetic) dipole (e.g., multiple loops of wire, for example, loops stacked along the longitudinal axis through each loop as depicted in FIG. 14 as reference character 1409). A transmitter (e.g., a dipole or a bipole) may be oriented to produce a (e.g., electromagnetic) field in a horizontal plane, e.g., relative to the earth. A transmitter (e.g., a dipole or a bipole) may be oriented to produce a (e.g., electromagnetic) field in a vertical plane, e.g., relative to the earth. A transmitter (e.g., a dipole or a bipole) may be oriented to produce a (e.g., electromagnetic) field in a horizontal and a vertical plane, e.g., relative to the earth.

Figure 2:
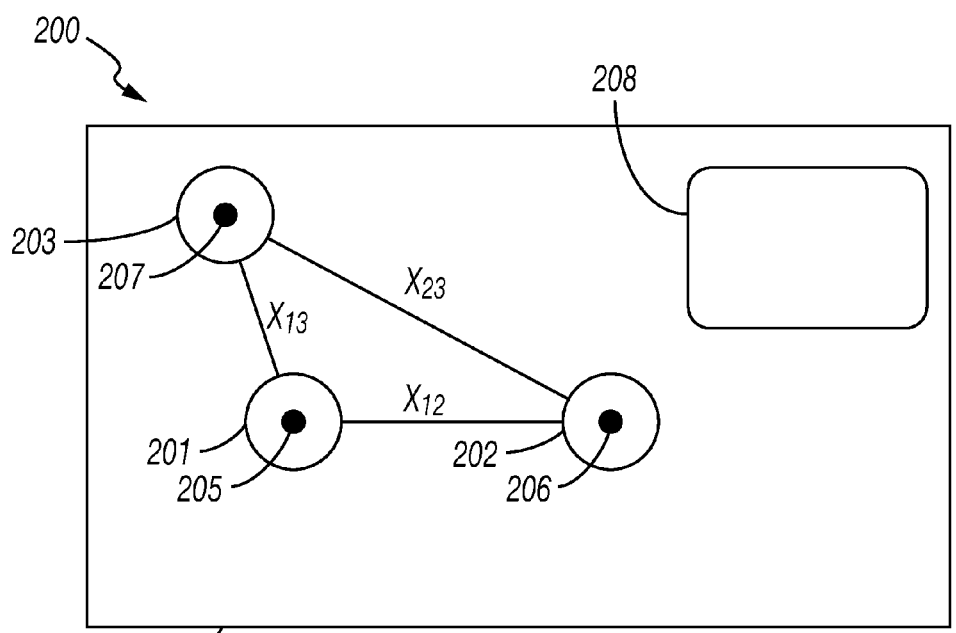
FIG. 2 illustrates a schematic of a crosswell logging system.

FIG. 2 illustrates a schematic of a crosswell logging system 200. In one aspect, this may be a view towards the earth's center. Crosswell logging system 200 depicted includes three boreholes (201, 202, 203) in the earth's surface 204 with receivers (105, 106, 107) (e.g., concentrically) disposed therein, accordingly. Interwell spacing between each pair of boreholes is indicated by referring to borehole 201 as number 1, borehole 202 as number 2, and borehole 203 as number 3, e.g., the depicted spacing between borehole 201 and borehole 202 is "$x_{12}$". Boreholes may be uniformly spaced or otherwise. Transmitter 208 is depicted as a coil of wire shaped as a rectangle with rounded corners, although any shape may be used. Transmitter may be aligned or skewed (e.g., as shown) away from a line extending across the center of two or more boreholes. Transmitter boundary (e.g., multiple loops of wire) may define an area at least 1000 square meters (e.g., a 100 meters by 100 meters square).

Figure 3:
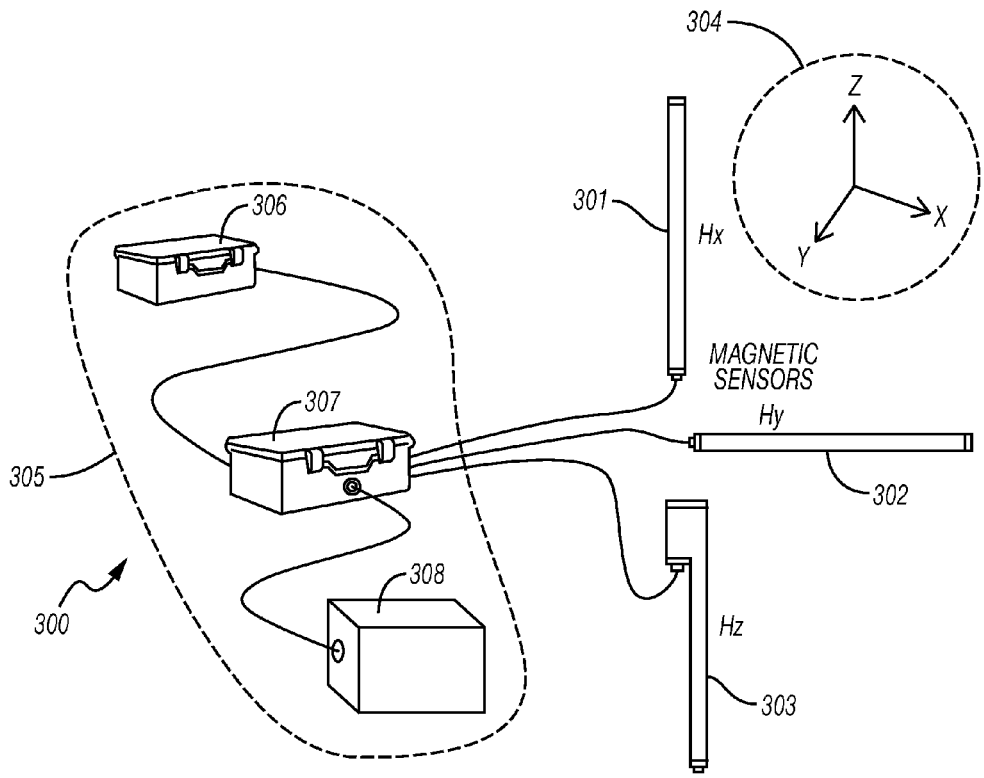
FIG. 3 illustrates an aspect of a crosswell logging system.

FIG. 3 illustrates an aspect of a crosswell logging system 300. Receivers (e.g., magnetometers Hx 301, Hy 302, and Hz 303 to detect the x, y, and z components of a magnetic field, accordingly) may be disposed in a borehole, for example, to form a multiple axis sensor when they are arranged orthogonally (e.g., arranged to provide three discrete outputs, each corresponding to the x, y, or z component of the xyz Cartesian coordinate system 304). Although electrical conductors (e.g., cables) are depicted, any means of communication, including wirelessly, may be used. Field signal(s) may be outputted from a receiver as a voltage and/or current. Signal may be outputted from a receiver as a magnetic field strength, e.g., in units of Amps per meter (A/m), or a magnetic flux density, e.g., in units of a Tesla. Receiver(s) may (e.g., electrically) connect to a processing unit 305. Processing unit may include each of, or any combination of, a recording member 306 (e.g., for recording the signals), a transmission member 307 (e.g., for transmitting the signals), and a processing member 308 (e.g., to process the signals, for example, filtering and/or manipulating the data set as discussed further below). Signals may be recorded at each borehole at a same time and/or phase, e.g., using a GPS phase synchronized clock. Receiver(s) may connect to a remote power source or include a power source (e.g., a battery) in the borehole. Although not shown, receivers may communicate to each member utilized (e.g., recording member 306, transmission member 307, and/or processing member 308) of processing unit 305. Processing unit 305 (e.g., processing member 308) may include a computer system (e.g., according to the computer architecture described below in reference to FIG. 15). Processing unit 305 (e.g., recording member 306) may record the field signals (e.g., on machine-readable storage medium).

In one aspect, the transmitter 108 of crosswell logging system in FIG. 1 may be powered to a desired level (e.g., to generate a desired electromagnetic field) to transmit through the earth to induce electromagnetic fields in the ground. Transmitted electromagnetic field may induce other electromagnetic fields. Each receiver (105, 106) may detect an induced electromagnetic field in its respective borehole (101, 102). Detection may include outputting a field signal corresponding to a measured strength (e.g., an amplitude) and/or direction (e.g., phase angle) of the induced electromagnetic field. The field signal (which may be an array of hundreds or thousands of signals from according sensors) for each borehole may correspond to the properties of the formation between the transmitter 408 and that particular borehole. However, in certain aspects, a data set for a zone of interest (e.g., 2-D or 3-D region) may be a portion of the section of earth (e.g., a formation) between two or more boreholes, e.g., the crosswell data set. In such aspects, a processing unit may take the field signals from a first borehole and compare them against the field signals from a receiver in a second borehole to generate a crosswell data set, e.g., comparing a set of field signals from one borehole to a set of field signals from a second borehole. Particularly, processing unit may determine a difference between the first field signal (e.g., the set of signals from the first receiver) and the second field signal (e.g., the set of signals from the second receiver) to generate a crosswell data set. This may be done via a processor, for example, in a crosswell data set module (e.g., see FIG. 15). Determining the difference between the first field signal and the second field signal may include determining an (e.g., absolute value of) amplitude difference between the first field signal and the second field signal to generate a crosswell data set. Additionally or instead, determining the difference between the first field signal and the second field signal may include determining a (e.g., absolute value of) phase angle difference between the first field signal and the second field signal. Any of this disclosure may be done via a processor, for example, in a crosswell data set module (e.g., see FIG. 15). Determining a difference may include (e.g., an absolute value of) subtracting two according values from each other (e.g., subtracting a first borehole signal from a second borehole signal corresponding to a same or similar depth and/or orientation to the first borehole signal). Determining a difference may include dividing two according values from each other (e.g., dividing one of a first borehole signal and a second borehole signal [being at a same or similar depth and/or orientation] by the other).

Figure 4:
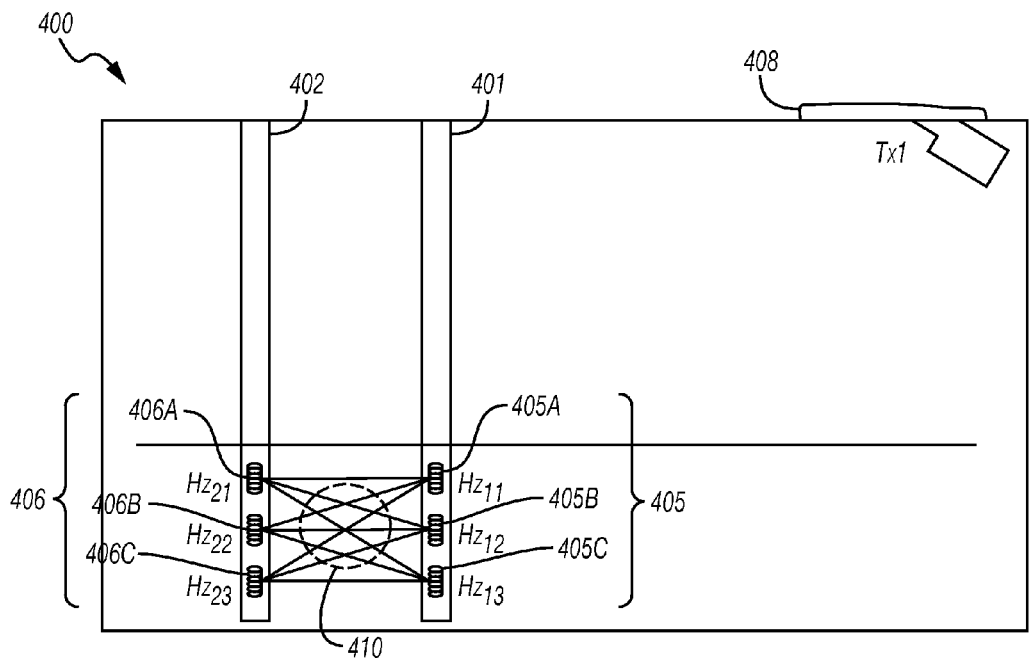
FIG. 4 illustrates a schematic of a crosswell logging system.

FIG. 4 illustrates a schematic of a crosswell logging system 400. Borehole 401 and borehole 402 include a zone of interest 410 therebetween with a receiver (405, 406) in each respective borehole. Receiver may include multiple magnetic field sensors (e.g., z-axis sensor Hz in FIG. 3, where H may refer to the magnetic field strength). Depicted receivers (405, 406) each include three axially spaced sensors (405A-405C; 406A-406C, accordingly). As noted above, a crosswell logging system may be utilized such that a difference processing unit may determine a difference between the first field signal (e.g., the set of signals from the first receiver 405) and the second field signal (e.g., the set of signals from the second receiver 406) to generate a crosswell data set. This may be done via a processor, for example, in a crosswell data set module (e.g., see FIG. 15). For example, (i) the difference between field signal (e.g., corresponding to the induced field detected thereby) at sensor 405A and the field signals at sensors 406A, 406B, and 406C (e.g., corresponding to the induced fields detected thereby) may be determined, (ii) the difference between field signal (e.g., corresponding to the induced field detected thereby) at sensor 405B and the field signals at sensors 406A, 406B, and 406C (e.g., corresponding to the induced fields detected thereby) may be determined, and (iii) the difference between field signal (e.g., corresponding to the induced field detected thereby) at sensor 405C and the field signals at sensors 406A, 406B, and 406C (e.g., corresponding to the induced fields detected thereby) may be determined to cumulatively generate a crosswell data set, e.g., as depicted between the two boreholes in FIG. 4. As above, determining the difference between the first field signal and the second field signal may include determining an (e.g., absolute value of) amplitude difference between the first field signal and the second field signal. Additionally or instead, determining a (e.g., absolute value of) phase angle may be determining the difference between the first field signal and the second field signal. Any of this disclosure may be done via a processor, for example, in a crosswell data set module (e.g., see FIG. 15). Determining a difference may include (e.g., an absolute value of) subtracting two values from each other (e.g., subtracting a first borehole signal from a second borehole signal being at a same or similar depth and/or orientation to the first borehole signal). Determining a difference may include dividing two according values from each other (e.g., dividing one of a first borehole signal and a second borehole signal [being at a same or similar depth and/or orientation] by the other of the first borehole signal and the second borehole signal).

A data set, e.g., from each receiver in a plurality of wells, may be utilized (e.g., after processing) to create a model. A model may be a viewable 2-D or 3-D model. In one aspect, tomography may be used. Tomography generally refers to creating a model (e.g., an image) by sections, through the use of a set of signals from a penetrating wave. For example, creating a formation model based on the mathematical procedure of tomographic reconstruction (e.g., magnetic induction tomography).

In one aspect, a received data set (e.g., signals from a receiver) is fit to data from a numerical model (e.g., a set of parameters for an equation(s) is determined) to create a formation model. In one aspect, the formation model is created by (e.g., fitting constants) using an inversion procedure. One example of an inversion procedure is a Gauss-Newton least-squares method, e.g., for 2-D or 3-D inversion of (e.g., resistivity) data. In one aspect, a resistivity model (e.g., derived from prior knowledge of the formation area) and a forward electromagnetic code use an inversion procedure to calculates a model response and then adjusts the model parameters (e.g., to-be-determined constants) until the observed and calculated data fit within a specified tolerance (e.g., sometimes referred to as c). A tolerance may be a value of the least mean squares, as is known in the art. In one aspect, the tolerance is less than 0.05 or 0.01, i.e., 5% or 1%, respectively.

Figure 5:
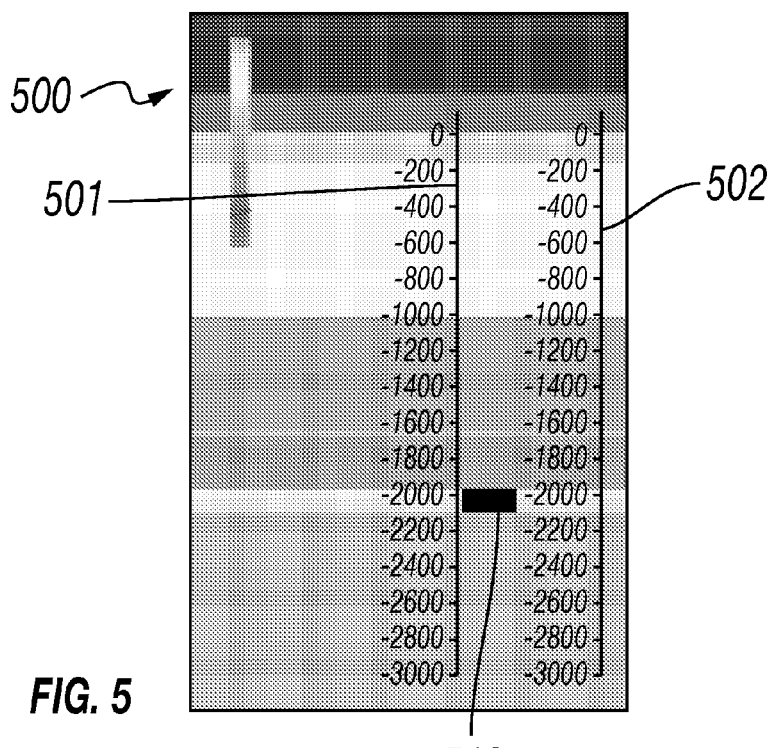
FIG. 5 illustrates a plot of a data set from one logging system configuration.
Figure 6:
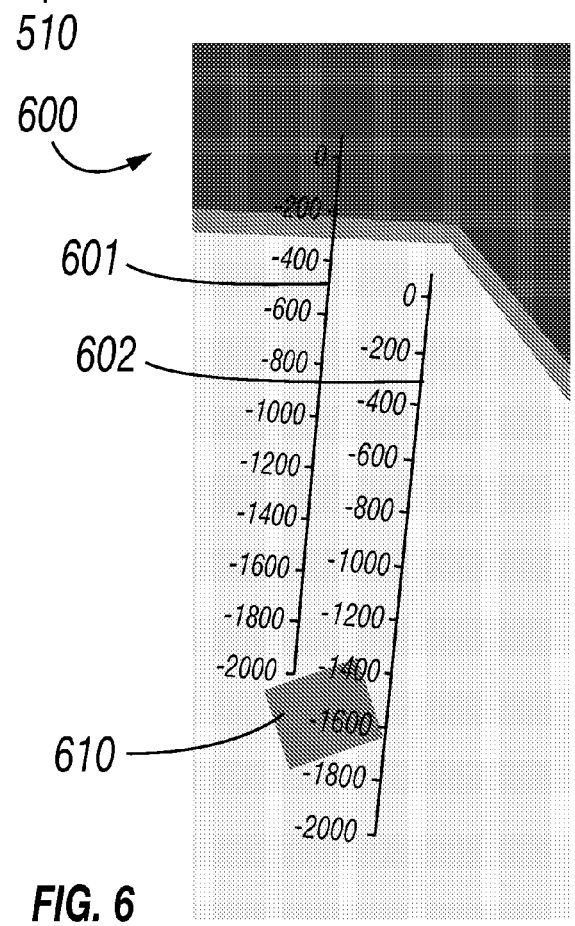
FIG. 6 illustrates a plot of a crosswell data set from a crosswell logging system.

For example, by utilizing the principles of electromagnetic induction and tomography, an image (e.g., 2-D, 3-D, or 4-D) formation model (e.g., of the resistivity distribution between a set of signals from each borehole) may be generated. FIG. 5 illustrates a plot 500 of a data set from one logging system configuration. Depicted first borehole 501 and second borehole 502 each include a receiver to produce a field signal from a field induced from an electromagnetic transmitter. FIG. 5 illustrates how such a non-crosswell data set from a receiver (e.g., in multiple boreholes) may produce a formation model that includes overburden and surface heterogeneities as well as other data points between a surface transmitter and receiver in addition to a zone of interest 510. However, a zone of interest may be between two receivers in their respective boreholes such that a formation model may exclude overburden and surface heterogeneities as well as other data points between a surface transmitter and receiver. A crosswell data set, for example, a crosswell data set generated from a difference between a first field signal (e.g., the set of signals from the first receiver) and a second field signal (e.g., the set of signals from the second receiver) as in FIG. 6 may be used to create a graph of a zone of interest 610. The crosswell data set (e.g., received field signals) may be inputted into a formation model in place of a non-crosswell data set. In one aspect, a crosswell data set is the amplitude ratios and phase differences between borehole-based receivers from the same surface-based transmitter or transmitters. For example, the crosswell data set indicated as the lines between boreholes in each of FIGS. 1 and 4.

In one aspect, a transmitter may be moved (e.g., to a second location) and field signals from each borehole receiver may be detected to generate a crosswell data set. For example, a transmitter may be disposed to a second (or third, fourth, etc.) location and a second (or third, fourth, etc.) electromagnetic field may be produced at the earth's surface. In such an aspect, a third field signal induced by the second electromagnetic field may be detected in a first borehole and fourth field signal induced by the second electromagnetic field may be detected in a second borehole, and a crosswell data set may be generated from the signals (e.g., the first, second, third, fourth, or any combination thereof). According to one aspect, a transmitter may be moved to a plurality of locations (or multiple transmitters can be used a discrete locations) to generate a crosswell data set according to this disclosure, e.g., in detecting in a first, second and a third borehole a respective field signal induced by a produced electromagnetic field and generating the crosswell data set from the first field signal, the second field signal, and the third field signal. Such a crosswell data set may be used to generate a 2-D, 3-D, or 4-D formation model.

Figure 7A:
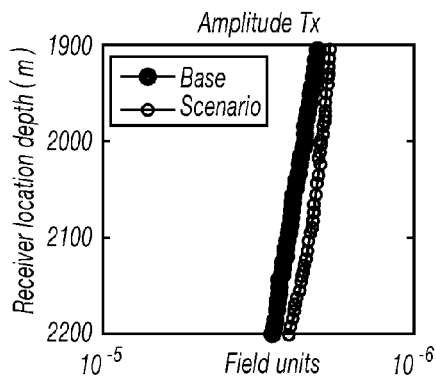
FIGS. 7A-7D illustrate various plots of a data set from one logging system configuration.
Figure 7B:
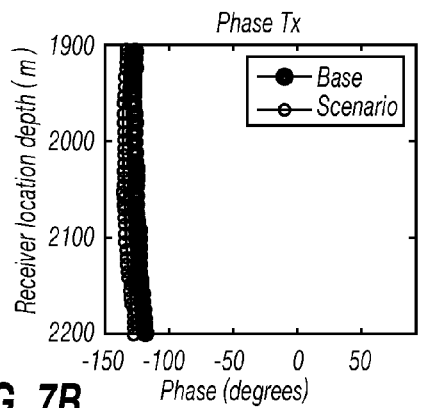
Figure 7C:
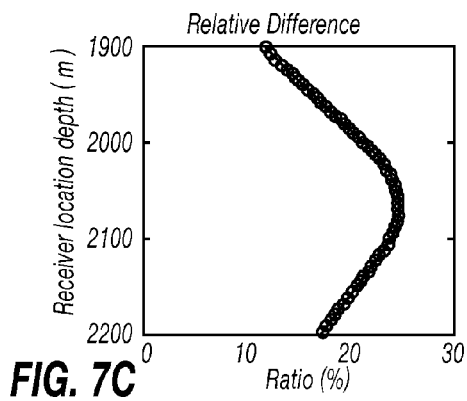
Figure 7D:
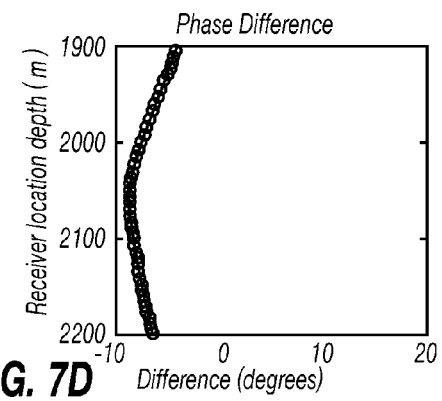

Turning now to FIGS. 7A-8D, as explained further below, one may view the increased sensitivity (e.g., of a target which may include a zone of interest) of a crosswell data set generated according to aspects of this disclosure as compared to a data set not generated according to aspects of this disclosure. FIGS. 7A-7D illustrate various plots of a data set from one logging system configuration. FIGS. 8A-8D illustrate various plots of a crosswell data set from a crosswell logging system. Particularly, a data set was generated for the field signal(s) from a respective receiver in two or more boreholes as induced from the same transmitter. For each of FIGS. 7A, 7B, 8C, and 8D, the "base" graph is a data set of a (e.g., homogenous) formation model without the zone of interest and the "scenario" graph is a data set of a formation model including the zone of interest (e.g., water or hydrocarbons). FIG. 7A illustrates the base and scenario graphs of the amplitude of field signals (e.g., in field units, such as, but not limited to, a voltage or a magnetic field strength such as an ampere/meter) versus receiver location (e.g., borehole depth in meters). FIG. 7B illustrates the base and scenario graphs of the phase angle of field signals (e.g., in degrees such as in phasor notation) versus receiver location (e.g., borehole depth in meters). FIG. 7C illustrates a graph of the difference (e.g., the ratio as shown or the delta) between the base and scenario graphs in FIG. 7A, e.g., indicating a graph for the amplitude of field signal(s) for the zone of interest since the data for the non-zone of interest will be removed by the difference calculation. FIG. 7D illustrates a graph of the difference (e.g., the delta as shown or the ratio) between the base and scenario graphs in FIG. 7B, e.g., indicating a graph for the phase angle of field signal(s) for the zone of interest since the data for the non-zone of interest will be removed by the difference calculation.

Figure 8A:
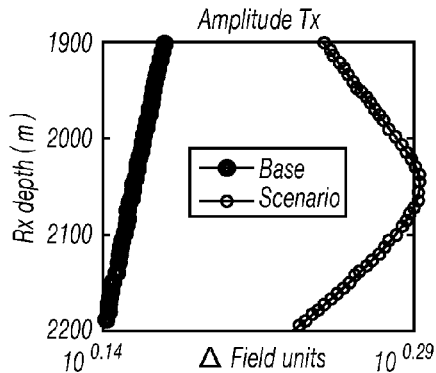
FIGS. 8A-8D illustrate various plots of a crosswell data set from a crosswell logging system.
Figure 8B:
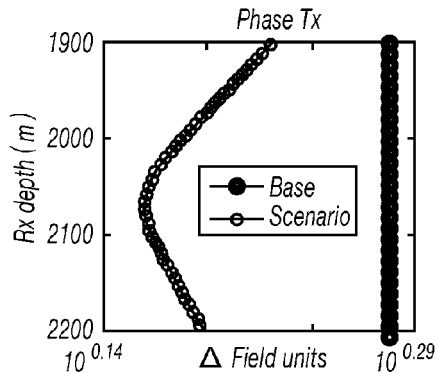
Figure 8C:
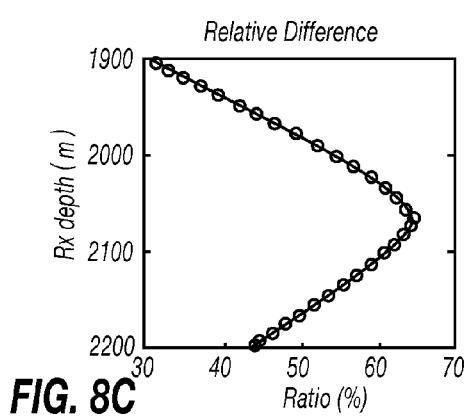
Figure 8D:
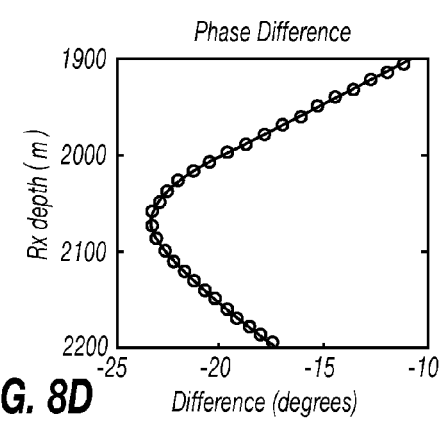

According to the above disclosure, FIGS. 8A-8D show the increased sensitivity of a crosswell data set generated according to aspects of this disclosure as compared to the non-crosswell data set in FIGS. 7A-7D. FIG. 8A illustrates the base and scenario crosswell graphs of the difference (for example, the delta, e.g., the absolute value of subtracting two values, or the ratio, e.g., dividing a first value by a second value or vice-versa, which may be multiplied by one hundred to provide a percentage) in the amplitude of field signals from a plurality of wells having a receiver therein (e.g., amplitude may be in field units, such as, but not limited to, a voltage or a magnetic field strength such as an ampere/meter) versus receiver location (e.g., borehole depth in meters). FIG. 8B illustrates the base and scenario crosswell graphs of the difference (for example, the delta, e.g., the absolute value of subtracting two values, or the ratio, e.g., dividing a first value by a second value or vice-versa, which may be multiplied by one hundred to provide a percentage) in the phase angle of field signals from a plurality of wells having a receiver therein (e.g., phase angle may be in degrees such as in phasor notation) versus receiver location (e.g., borehole depth in meters). FIG. 8C illustrates a graph of the difference (for example, the delta, e.g., the absolute value of subtracting two values, or the ratio [as shown], e.g., dividing a first value by a second value or vice-versa, which may be multiplied by one hundred to provide a percentage) between the base and scenario crosswell data graphs in FIG. 8A, e.g., indicating a graph for the difference in the amplitude of field signal(s) for the zone of interest since the data for the non-zone of interest will be removed by the difference calculation. FIG. 8D illustrates a graph of the difference (for example, the delta [as shown], e.g., the absolute value of subtracting two values, or the ratio, e.g., dividing a first value by a second value or vice-versa, which may be multiplied by one hundred to provide a percentage) between the base and scenario crosswell graphs in FIG. 8B, e.g., indicating a graph for the difference of the phase angle of field signal(s) for the zone of interest since the data for the non-zone of interest will be removed by the difference calculation. By comparing FIG. 7C to FIG. 8C and comparing FIGS. 7D and 8D, one can see the crosswell data set used in FIGS. 8C and 8D shows twice as large (e.g., the sensitivity) as the non-crosswell (e.g., surface to borehole) response in FIGS. 7C and 7D, but of a similar character (e.g., shape of the graphs).

Figure 9:
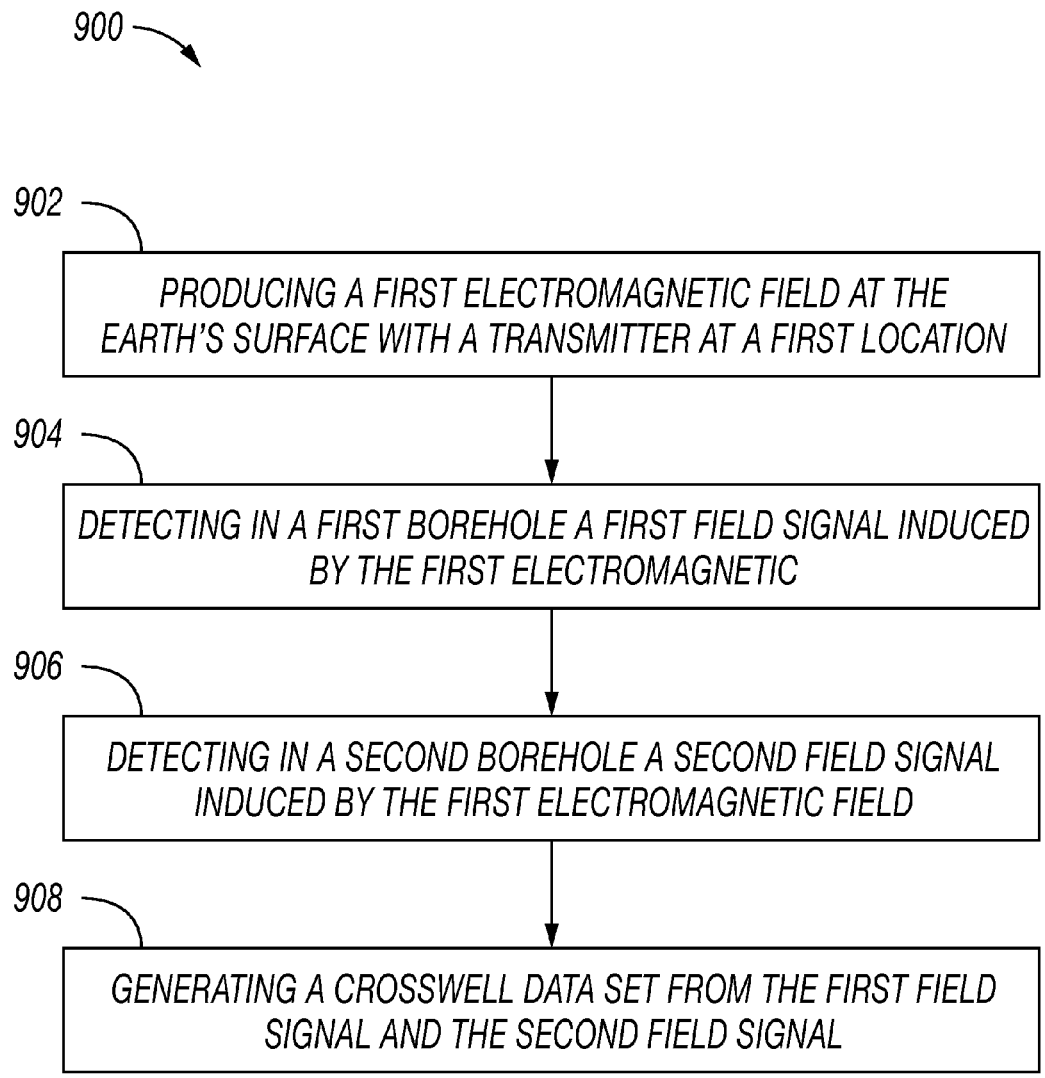
FIG. 9 illustrates an aspect of a method to generate a crosswell data set.

FIG. 9 illustrates an aspect of a method 900 to generate a crosswell data set. The method includes producing a first electromagnetic field at the earth's surface with a transmitter at a first location 902, detecting in a first borehole a first field signal induced by the first electromagnetic field 904, detecting in a second borehole a second field signal induced by the first electromagnetic field 906, and generating a crosswell data set from the first field signal and the second field signal 908.

Figure 10:
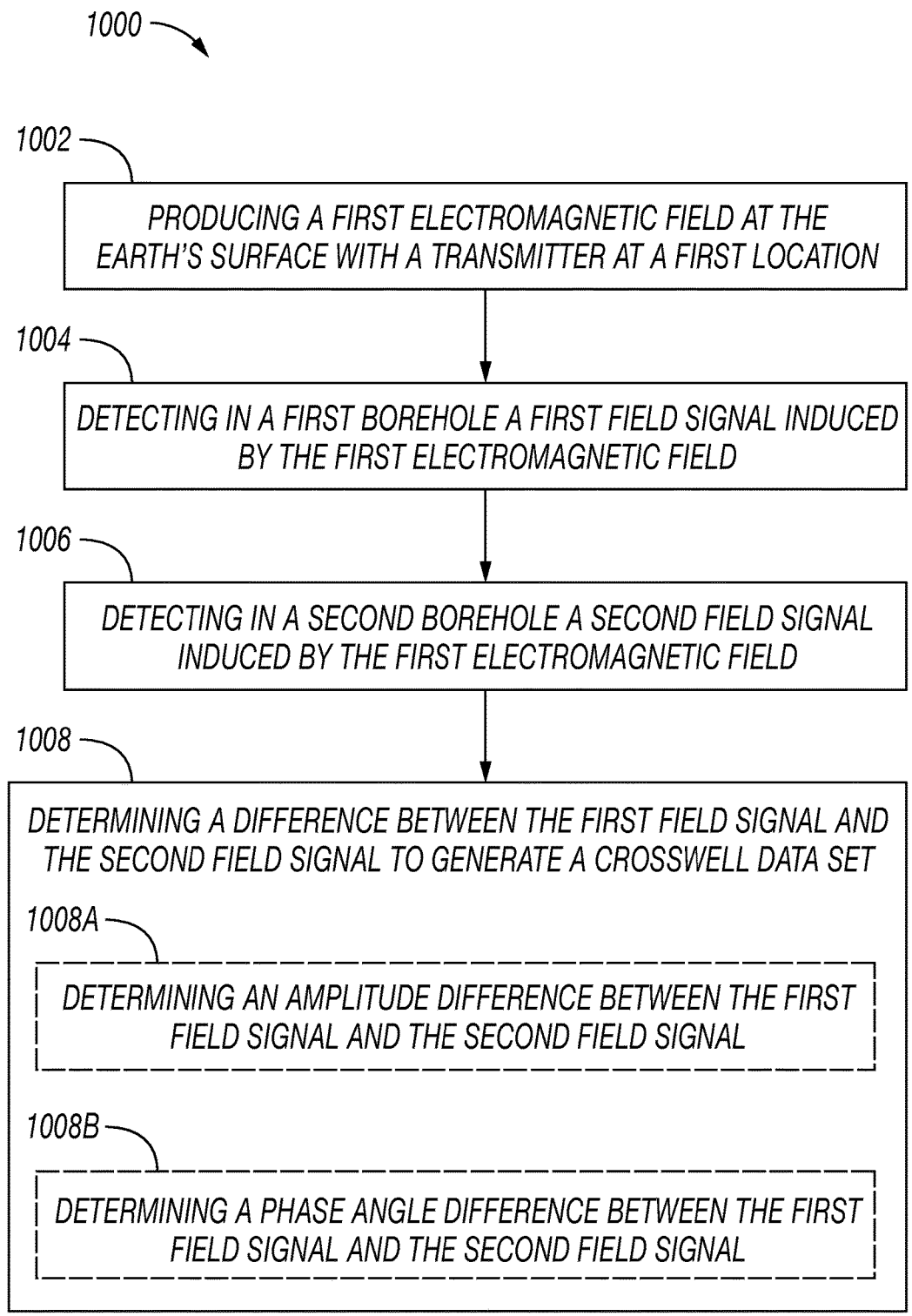
FIG. 10 illustrates an aspect of a method to generate a crosswell data set.

FIG. 10 illustrates an aspect of a method 1000 to generate a crosswell data set. The method includes producing a first electromagnetic field at the earth's surface with a transmitter at a first location 1002, detecting in a first borehole a first field signal induced by the first electromagnetic field 1004, detecting in a second borehole a second field signal induced by the first electromagnetic field 1006, and determining a difference between the first field signal and the second field signal to generate a crosswell data set 1008. In one aspect, determining includes determining an amplitude difference between the first field signal and the second field signal 1008A. Additionally or instead, determining may include determining a phase angle difference between the first field signal and the second field signal 1008B.

Figure 11:
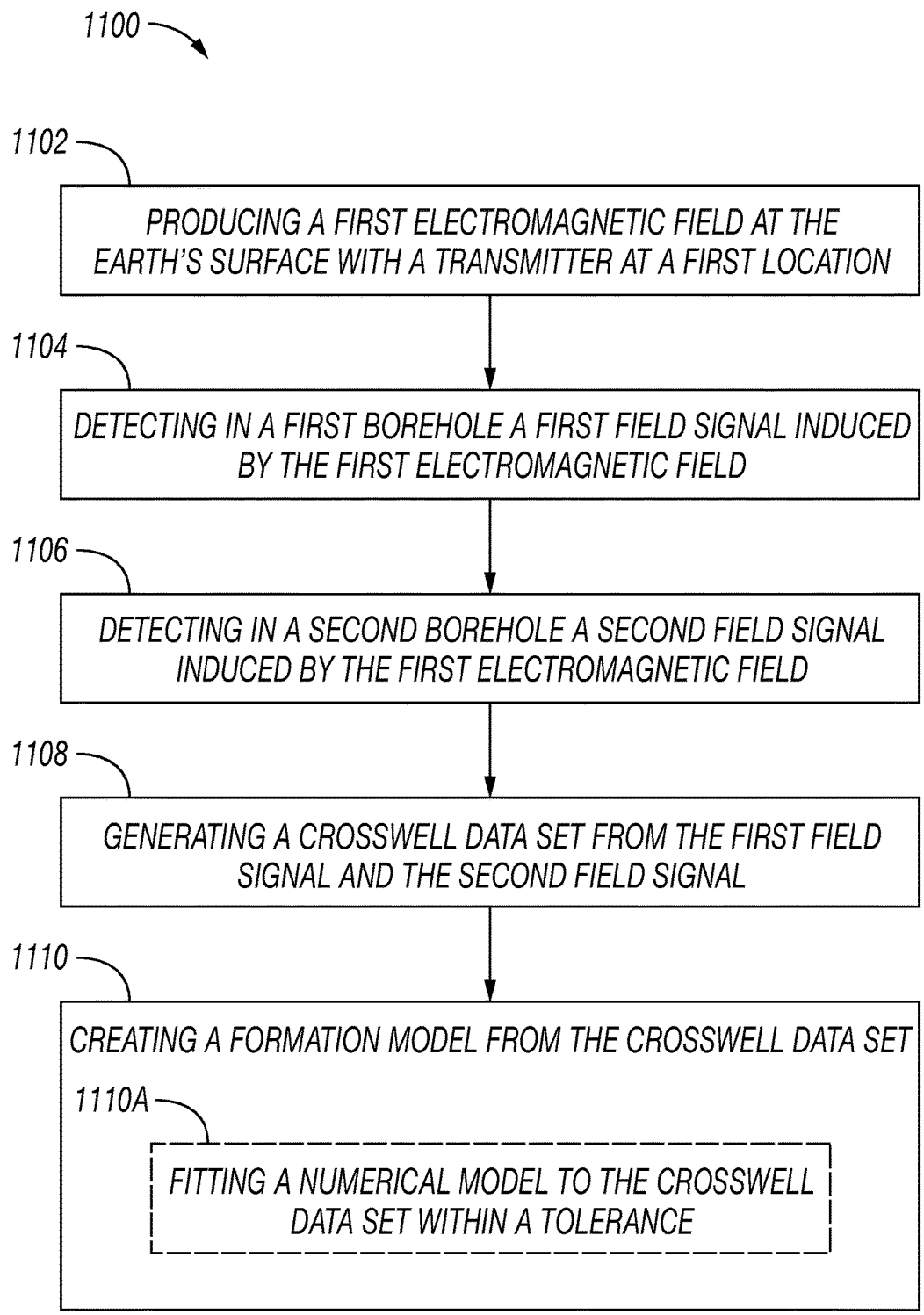
FIG. 11 illustrates an aspect of a method to create a formation model from a crosswell data set.

FIG. 11 illustrates an aspect of a method 1100 to create a formation model from a crosswell data set. The method includes producing a first electromagnetic field at the earth's surface with a transmitter at a first location 1102, detecting in a first borehole a first field signal induced by the first electromagnetic field 1104, detecting in a second borehole a second field signal induced by the first electromagnetic field 1106, generating a crosswell data set from the first field signal and the second field signal 1108, and creating a formation model from the crosswell data set 1110. Creating may include fitting (e.g., providing a best fit) a numerical model to the crosswell data set within a tolerance.

Figure 12:
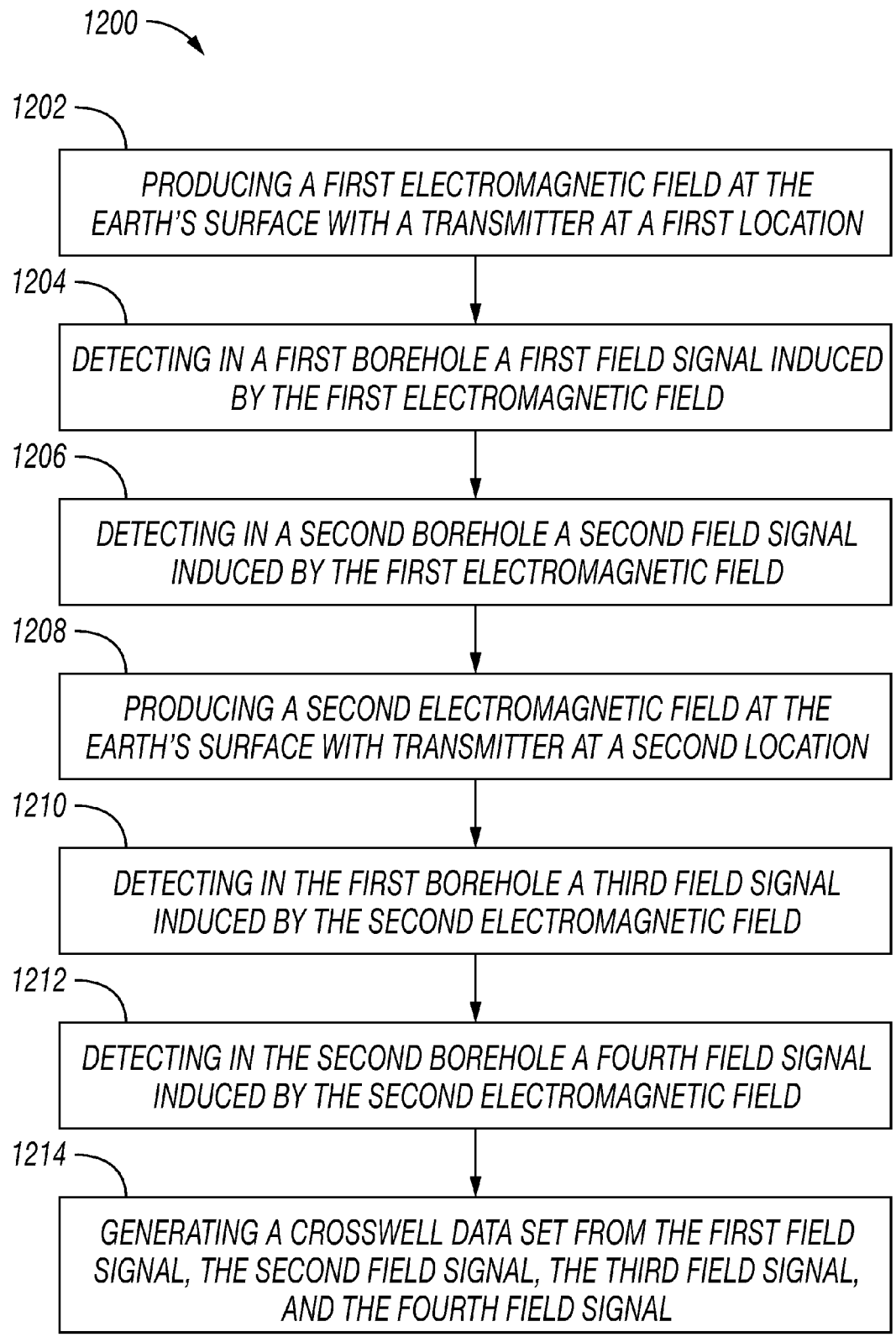
FIG. 12 illustrates an aspect of a method to generate a crosswell data set.

FIG. 12 illustrates an aspect of a method 1200 to generate a crosswell data set. The method includes producing a first electromagnetic field at the earth's surface with a transmitter at a first location 1202, detecting in a first borehole a first field signal induced by the first electromagnetic field 1204, detecting in a second borehole a second field signal induced by the first electromagnetic field 1206, producing a second electromagnetic field at the earth's surface with the transmitter at a second location 1208, detecting in the first borehole a third field signal induced by the second electromagnetic field 1210, detecting in the second borehole a fourth field signal induced by the second electromagnetic field 1212, and generating a crosswell data set from the first field signal, the second field signal, the third field signal, and the fourth field signal 1214.

Figure 13:
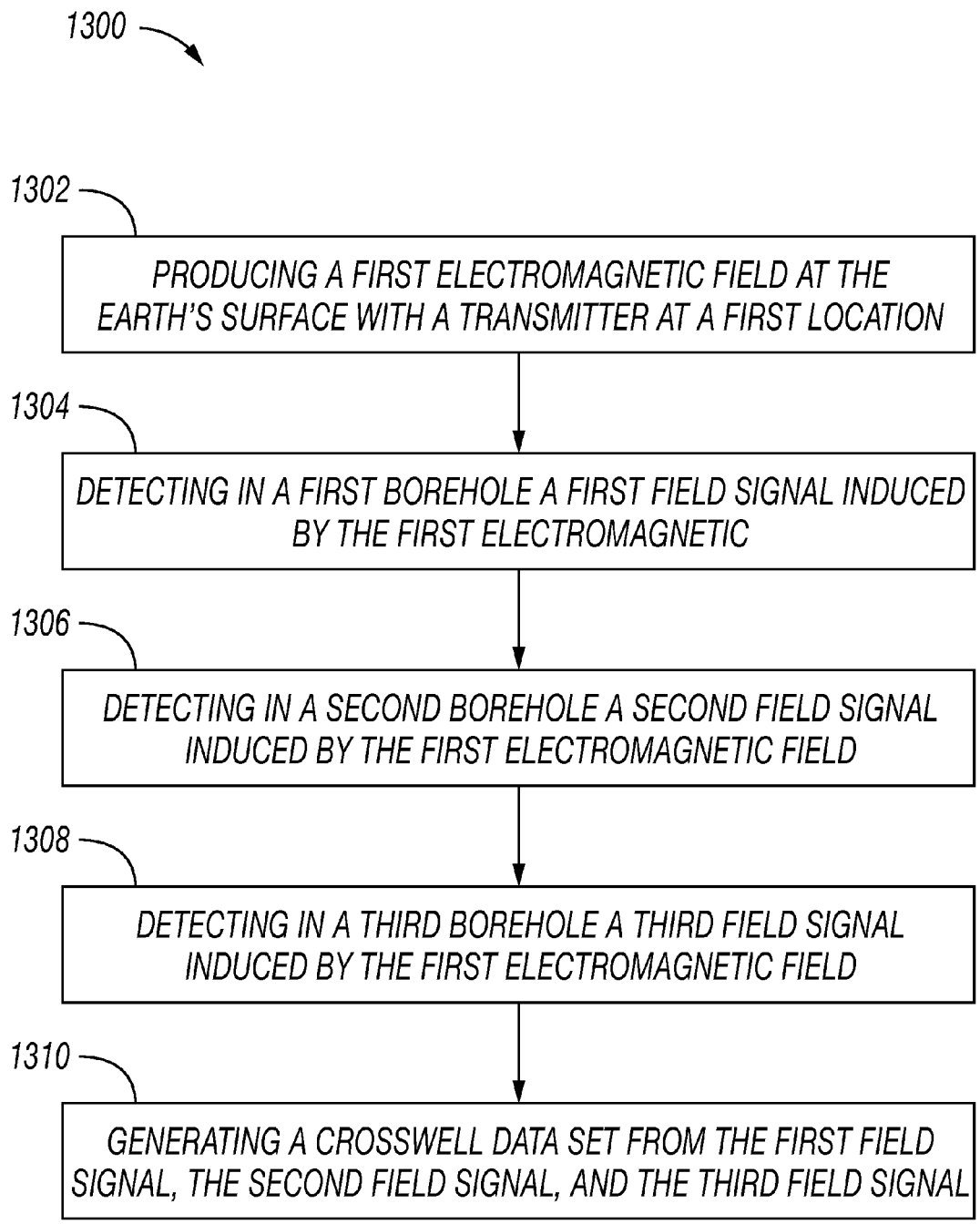
FIG. 13 illustrates an aspect of a method to generate a crosswell data set.

FIG. 13 illustrates an aspect of a method 1300 to generate a crosswell data set. The method includes producing a first electromagnetic field at the earth's surface with a transmitter at a first location 1302, detecting in a first borehole a first field signal induced by the first electromagnetic field 1304, detecting in a second borehole a second field signal induced by the first electromagnetic field 1306, detecting in a third borehole a third field signal induced by the first electromagnetic field 1308, and generating a crosswell data set from the first field signal, the second field signal, and the third field signal 1310.

FIG. 14 illustrates a schematic of a crosswell logging system 1400. Borehole 1401 and borehole 1402 include a zone of interest 1410 therebetween with a receiver (1405, 1406) in each respective borehole. Receiver may include multiple electric and/or magnetic field sensors (e.g., z-axis sensor Hz in FIG. 3, where H may refer to the magnetic field strength). Depicted receivers (1405, 1406) each include four (although a single or a plurality of sensors may be used) axially spaced sensors (1405A-1405D; 1406A-1406D, accordingly). As noted above, a crosswell logging system may be utilized such that a difference processing unit may determine a difference between the first field signal (e.g., the set of signals from the first receiver 1405) and the second field signal (e.g., the set of signals from the second receiver 1406) to generate a crosswell data set. This may be done via a processor, for example, in a crosswell data set module (e.g., see FIG. 15). For example, (i) the difference between field signal (e.g., corresponding to the induced field detected thereby) at sensor 1405A and the field signals at sensors 1406A, 1406B, 1406C, and 1406D (e.g., corresponding to the induced fields detected thereby) may be determined, (ii) the difference between field signal (e.g., corresponding to the induced field detected thereby) at sensor 1405B and the field signals at sensors 1406A, 1406B, 1406C, and 1406D (e.g., corresponding to the induced fields detected thereby) may be determined, (iii) the difference between field signal (e.g., corresponding to the induced field detected thereby) at sensor 1405C and the field signals at sensors 1406A, 1406B, 1406C, and 1406D (e.g., corresponding to the induced fields detected thereby), and (iv) the difference between field signal (e.g., corresponding to the induced field detected thereby) at sensor 1405D and the field signals at sensors 1406A, 1406B, 1406C, and 1406D (e.g., corresponding to the induced fields detected thereby) may be determined to cumulatively generate a crosswell data set, e.g., as depicted between the two boreholes in FIG. 14. As above, determining the difference between the first field signal and the second field signal may include determining an (e.g., absolute value of) amplitude difference between the first field signal and the second field signal. Additionally or instead, determining a (e.g., absolute value of) phase angle may be determining the difference between the first field signal and the second field signal. Any of this disclosure may be done via a processor, for example, in a crosswell data set module (e.g., see FIG. 15). Determining a difference may include (e.g., an absolute value of) subtracting two values from each other (e.g., subtracting a first borehole signal from a second borehole signal being at a same or similar depth and/or orientation to the first borehole signal). Determining a difference may include dividing two according values from each other (e.g., dividing one of a first borehole signal and a second borehole signal [being at a same or similar depth and/or orientation] by the other of the first borehole signal and the second borehole signal).

A receiver may be disposed (e.g., suspended) in a borehole in any manner, for example, via a wireline (1411, 1412) as depicted or a drillstring (not shown). Wireline may be suspended from one or more trucks (1415), although any other support apparatus (e.g., crane, drilling rig, etc.) may be utilized. Wireline (e.g., armored multiconductor cable) may include a communication line, e.g., electrical conductor or an optical fiber. Receiver may communicate through a communication line and/or wirelessly, e.g., via radio waves. Receiver may include a communications unit that collects the data (e.g., signals) from a sensor of a receiver (1405, 1406) and transmits it. For example, the data may be transmitted to a processing unit, depicted in FIG. 1 as a laptop computer 117 (although this disclosure is not so limited). The word "signal" generally refers to any information that may be transmitted and/or received.

Depicted crosswell logging system 1400 includes multiple transmitters 1450 disposed on (or at) the earth's surface 1404. Transmitter may produce a signal, such as an electromagnetic field. In one aspect, a plurality of transmitters (e.g., 1407 and 1409) is powered concurrently to produce multiple fields. A transmitter (e.g., a surface transmitter) 1407 may be a (e.g., electric and/or magnetic) bipole, e.g., a plurality of grounded electrodes (1407A, 1407B). Grounded electrodes may be laterally spaced. A transmitter may be a (e.g., electric and/or magnetic) dipole, e.g., multiple loops of wire, for example, loops stacked along the longitudinal axis through each loop as depicted in FIG. 14 as reference character 1409. Truck 1419 and/or trailer 1421 may include a field generating source (e.g., a power source) which is connected to a transmitter, such as the grounded, electrode type of antenna 1407 and/or the wire loop type of antenna 1409. In one aspect, electrodes (1407A, 1407B) are inserted into the earth's surface, for example, at a depth of less than about one meter. As indicated by the dotted circle, wire loop type of antenna 1409 of transmitter is shown from an "above" view (e.g., a view towards the earth's center) as opposed to the rest of FIG. 14 which is a "side" view. A power source of transmitter may supply power (e.g., a desired current and/or voltage) to an antenna(s) of transmitter to create a (e.g., electromagnetic) field.

As noted above, a data set (e.g., from each receiver in a plurality of wells) may be utilized (e.g., after processing) to create a model. A model may be a viewable 2-D or 3-D model. In one aspect, tomography may be used. Tomography generally refers to creating a model (e.g., an image) by sections, through the use of a set of signals from a penetrating wave. For example, creating a formation model based on the mathematical procedure of tomographic reconstruction (e.g., magnetic induction tomography).

Figure 15:
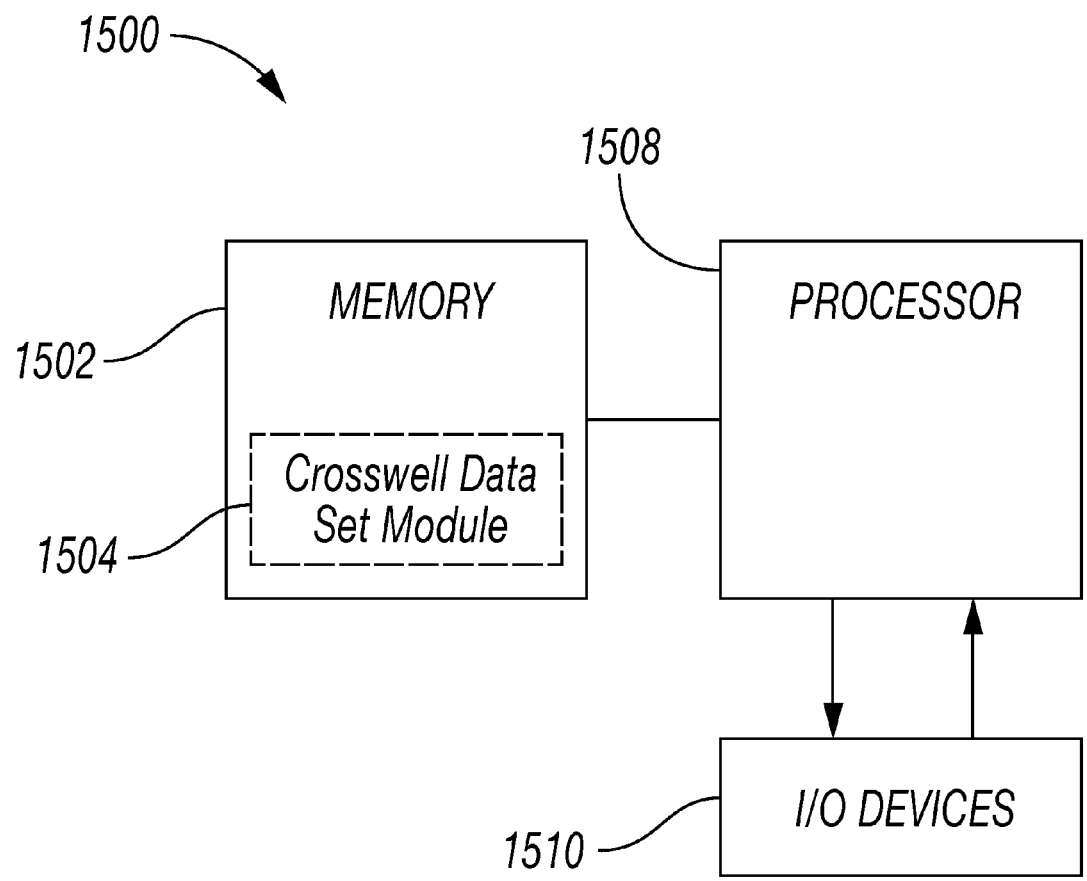
FIG. 15 illustrates an aspect of a block diagram of a computer architecture.

FIG. 15 illustrates an aspect of a block diagram 1500 of a computer architecture. Various I/O devices 1510 may be coupled (e.g., via a bus) to processor 1508 (or set of processors), for example, a keyboard, mouse, audio device, display device, and/or communication device. In one aspect, an input device inputs field signal(s) into the memory and/or processor. Memory 1502 may be coupled to processor. Memory 1502 may include a disk drive or other mass storage device which may include instructions/code and data, in one aspect. Note that other architectures are possible.

Aspects of the disclosure disclosed herein may be implemented in hardware, software, firmware, or a combination of such implementation approaches. Aspects of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions and methods described herein and generate output information (e.g., a crosswell data set and/or a formation model). The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The disclosure herein is not limited in scope to any particular programming language. The language may be a compiled or interpreted language.

One or more aspects of at least one aspect may be implemented by representative instructions stored on a machine-readable medium which represents various logic within the processor, which when read by a machine causes the machine to fabricate logic to perform the techniques described herein. Such implementations may be stored on a tangible, machine readable medium.

Such machine-readable storage media may include, without limitation, non-transitory, tangible arrangements of articles manufactured or formed by a machine or device, including storage media such as hard disks, any other type of disk including floppy disks, optical disks, compact disk read memories (CD-ROMs), compact disk rewritable's (CD-RWs), and magneto-optical disks, semiconductor devices such as read memories (ROMs), random access memories (RAMs) such as dynamic random access memories (DRAMs), static random access memories (SRAMs), erasable programmable read memories (EPROMs), flash memories, electrically erasable programmable read memories (EEPROMs), phase change memory (PCM), magnetic or optical cards, or any other type of media suitable for storing electronic instructions.

Accordingly, aspects of the disclosure also include non-transitory, tangible machine-readable media containing instructions or containing design data, such as Hardware Description Language (HDL), which defines structures, circuits, apparatuses, processors and/or system features described herein. Such aspects may also be referred to as program products.

The module may be implemented in software, hardware, firmware, or a combination thereof. The instruction converter may be on processor, off processor, or part on and part off processor.

What is claimed is:

1. A crosswell logging system comprising:
    a transmitter at the earth's surface producing an electromagnetic field;
    a first receiver in a first borehole detecting a first field signal induced by the electromagnetic field;
    a second receiver in a second borehole detecting a second field signal induced by the electromagnetic field produced by the transmitter at the earth's surface; and
    a processing unit generating a crosswell data set from the first field signal and the second field signal, wherein the processing unit further comprises determining a difference between the first field signal and the second field signal;
    wherein a global positioning system (GPS) phase synchronized clock associated to each receiver so that the crosswell dataset generated from the first and second field signals are recorded at the same time.

2. The crosswell logging system of claim 1, wherein at least one of the first receiver and the second receiver comprises a multiple axis sensor.

3. The crosswell logging system of claim 2, wherein the multiple axis sensor comprises a magnetometer.

4. The crosswell logging system of claim 1, wherein the processing unit creates a formation model from the crosswell data set.

5. The crosswell logging system of claim 1, wherein the transmitter is entirely above the earth's surface.

6. A crosswell logging system comprising:
    producing a first electromagnetic field at the earth's surface with a transmitter at a first location;
    detecting, by a first receiver, in a first borehole a first field signal induced by the first electromagnetic field;
    detecting, by a second receiver, in a second borehole a second field signal induced by the first electromagnetic field; and
    generating a crosswell data set from the first field signal and the second field signal, both induced by the electromagnetic field produced by the transmitter at the earth's surface, wherein generating the crosswell data set further comprises determining a difference between the first field signal and the second field signal;

wherein a global positioning system (GPS) phase synchronized clock associated to each receiver so that the crosswell dataset generated from the first and second field signals are recorded at the same time.

7. The method of claim 6, wherein determining the difference between the first field signal and the second field signal comprises at least one of determining an amplitude difference between the first field signal and the second field signal and determining a phase angle difference between the first field signal and the second field signal.

8. The method of claim 6, further comprising:
producing a second electromagnetic field at the earth's surface with the transmitter at a second location;
detecting in the first borehole a third field signal induced by the second electromagnetic field;
detecting in the second borehole a fourth field signal induced by the second electromagnetic field; and
wherein generating further comprises generating the crosswell data set from the third field signal and the fourth field signal.

9. The method of claim 8, wherein the first electromagnetic field and the second electromagnetic field are produced at discrete times.

10. The method of claim 6, further comprising creating a formation model from the crosswell data set.

11. The method of claim 10, wherein creating the formation model comprises fitting a numerical model to the crosswell data set within a tolerance.

12. The method of claim 6, further comprising:
detecting in a third borehole a third field signal induced by the first electromagnetic field; and
wherein generating comprises generating the crosswell data set from the first field signal, the second field signal, and the third field signal.

13. The method of claim 6, wherein the first electromagnetic field is produced by the transmitter entirely above the earth's surface.

14. A crosswell logging system comprising:
a set of one or more processors; and
a set of one or more data storage devices that store instructions, that when executed by the set of processors, cause the set of one or more processors to perform the following: producing a first electromagnetic field at the earth's surface with a transmitter at a first location;
detecting, by a first receiver, in a first borehole a first field signal induced by the first electromagnetic field;
detecting, by a second receiver, in a second borehole a second field signal induced by the first electromagnetic field produced by the transmitter at the earth's surface; and
generating a crosswell data set from the first field signal and the second field signal including a difference between the first field signal and the second field signal;
wherein a global positioning system (GPS) phase synchronized clock associated to each receiver so that the crosswell dataset generated from the first and second field signals are recorded at the same time.

15. The apparatus of claim 14, wherein the set of data storage devices further stores instructions, that when executed by the set of processors, cause the set of processors to perform the following:
wherein determining the difference between the first field signal and the second field signal comprises at least one of determining an amplitude difference between the first field signal and the second field signal and determining a phase angle difference between the first field signal and the second field signal.

16. The apparatus of claim 14, wherein the set of data storage devices further stores instructions, that when executed by the set of processors, cause the set of processors to perform the following:
producing a second electromagnetic field at the earth's surface with the transmitter at a second location;
detecting in the first borehole a third field signal induced by the second electromagnetic field;
detecting in the second borehole a fourth field signal induced by the second electromagnetic field; and
wherein generating further comprises generating the crosswell data set from the third field signal and the fourth field signal.

17. The apparatus of claim 16, wherein the set of data storage devices further stores instructions, that when executed by the set of processors, cause the set of processors to perform the following:
producing the first electromagnetic field and the second electromagnetic field at discrete times.

18. The apparatus of claim 14, wherein the set of data storage devices further stores instructions, that when executed by the set of processors, cause the set of processors to perform the following:
creating a formation model from the crosswell data set.

19. The apparatus of claim 18, wherein the set of data storage devices further stores instructions, that when executed by the set of processors, cause the set of processors to perform the following:
wherein creating the formation model comprises fitting a numerical model to the crosswell data set within a tolerance.

20. The apparatus of claim 14, wherein the set of data storage devices further stores instructions, that when executed by the set of processors, cause the set of processors to perform the following:
detecting in a third borehole a third field signal induced by the first electromagnetic field; and
wherein generating comprises generating the crosswell data set from the first field signal, the second field signal, and the third field signal.

21. The apparatus of claim 14, wherein the set of data storage devices further stores instructions, that when executed by the set of processors, cause the set of processors to perform the following:
producing the first electromagnetic field at the earth's surface with the transmitter entirely above the earth's surface.

22. The system of claim 1, wherein the crosswell data set is characteristic of a property of the formation between first and second boreholes.

* * * * *